United States Patent [19]

Andriessen et al.

[11] Patent Number: 4,578,731

[45] Date of Patent: Mar. 25, 1986

[54] DEVICE FOR SUPPLYING AN ELECTRIC RECEIVER WHOSE POSITION ON A SURFACE IS VARIABLE

[75] Inventors: Johannes Andriessen, Verrey-sous-Salmaise; Daniel Gaillard, Mirebeau-sur-Beze, both of France

[73] Assignee: Assistance Maintenance Construction Electrique, Verry-sous-Salmaise, France

[21] Appl. No.: 591,495

[22] Filed: Mar. 20, 1984

[30] Foreign Application Priority Data

Feb. 3, 1984 [EP] European Pat. Off. ........ 84400243.6

[51] Int. Cl.$^4$ .............................................. H02H 3/16
[52] U.S. Cl. ....................................... 361/42; 339/96; 174/70 R
[58] Field of Search ............... 361/332, 414, 417, 420, 361/42, 47, 48, 50, 49; 340/650, 651; 307/114, 12, 42; 174/70 R, 48, 52 R; 339/96, 99 L, 97 R, 98, 99 R; 200/51 R, 51.12, 162

[56] References Cited

U.S. PATENT DOCUMENTS

| | | | |
|---|---|---|---|
| 2,506,171 | 5/1950 | Perillo | 307/114 X |
| 3,242,382 | 3/1966 | Rogers, Sr. | 361/49 |
| 3,522,474 | 8/1970 | Piel . | |
| 3,553,675 | 1/1971 | Shaver et al. | 174/70 R X |
| 3,809,969 | 5/1974 | Williams et al. | 361/332 |
| 4,134,132 | 1/1979 | Magos et al. . | |
| 4,144,420 | 3/1979 | Phillips | 200/51 R |

FOREIGN PATENT DOCUMENTS

| | | | |
|---|---|---|---|
| 1103335 | 5/1955 | France | 339/96 |
| 1097274 | 7/1955 | France . | |
| 1368914 | 6/1964 | France | 339/96 |
| 247777 | 2/1926 | United Kingdom | 339/96 |

*Primary Examiner*—Harry E. Moose, Jr.
*Attorney, Agent, or Firm*—Sandler & Greenblum

[57] ABSTRACT

A device for supplying an electric receiver whose position is variable on a surface, comprises, on said surface, a network of parallel strips made of an electrically conducting material, of the same width and spaced apart from one another, these strips being imbricated alternately in one another. These strips form two assemblies respectively connected to the two poles of a source of electrical current. A current pick-up with variable position bears at least two sensors adapted to come into contact with the conducting strips, and connected to a switching circuit for supplying the receiver. The network of parallel conducting strips is covered with a layer of insulating material and the current sensors are made in the form of metal contact styluses of the same length passing through the layer of insulating material forming the upper covering applied on the conducting strips.

19 Claims, 12 Drawing Figures

DEVICE FOR SUPPLYING AN ELECTRIC RECEIVER WHOSE POSITION ON A SURFACE IS VARIABLE

BACKGROUND OF THE INVENTION

The present invention relates to a device for supplying an electric receiver whose position on a surface is variable, applicable in particular to the supply of a mobile lighting appliance or to the reception of any electric signal by an appliance.

Appliances for receiving and using electrical energy, such as for example lamps, motors, etc. are generally connected, near their site of use, to the A.C. mains and such distribution of the electrical energy imposes certain constraints by reason of the necessry connection of the receiver to the convenience receptacles.

Devices are also known for supplying electric motors of vehicles moving along a path comprising conducting zones and in particular vehicles circulating in amusement parks. Such a supply device is for example described in French Pat. No. 1 097 274. This supply device comprises, on the ground, a network of parallel conducting strips, spaced apart from one another and taken alternately to different potentials. For its part, the vehicle bears a certain number of brushes or feelers rubbing on the conducting strips and disposed so that at least two of these brushes are always in contact with two conducting strips at different potentials, so as to be able to supply electric current to the motor of the vehicle.

SUMMARY OF THE INVENTION

The present invention envisages the particular application of such a network of parallel conducting strips for supplying electricity, in complete safety, to appliances which are fixed but whose positions on any surface may be chosen as desired.

To this end, this device for supplying an electric receiver whose position on a surface is variable, comprising, on the surface, a network of parallel strips made of an electrically conducting material, of the same width and spaced apart from one another, these strips being imbricated alternately in one another, forming two assemblies, namely a first assembly of strips of even rows connected to one pole of a source of electrical current, and a second assembly of strips of odd rows connected to the other pole of the source of current, a current pick-up with variable position bearing at least two sensors adapted to come into contact with the conducting strips, and a switching circuit for supplying the receiver, this circuit having a plurality of inputs connected respectively to the current sensors and an output connected to the receiver to allow supply of the receiver when at least two of the current sensors come into contact with two conducting strips belonging respectively to the first and second assemblies of strips connected to the two poles of the source of electrical current, is characterized in that the network of parallel conducting strips is covered with a layer of insulating material and the current sensors are made in the form of metal contact styluses of the same length passing through the layer of insulating material forming the upper covering applied on the conducting strips.

The source of electrical current supplying the two assemblies of conducting strips may furnish a direct or alternating current.

BRIEF DESCRIPTION OF THE DRAWINGS

The invention will be more readily understood on reading the following description with reference to the accompanying drawings, in which.

DESCRIPTION OF THE PREFERRED EMBODIMENTS

Figure 1:
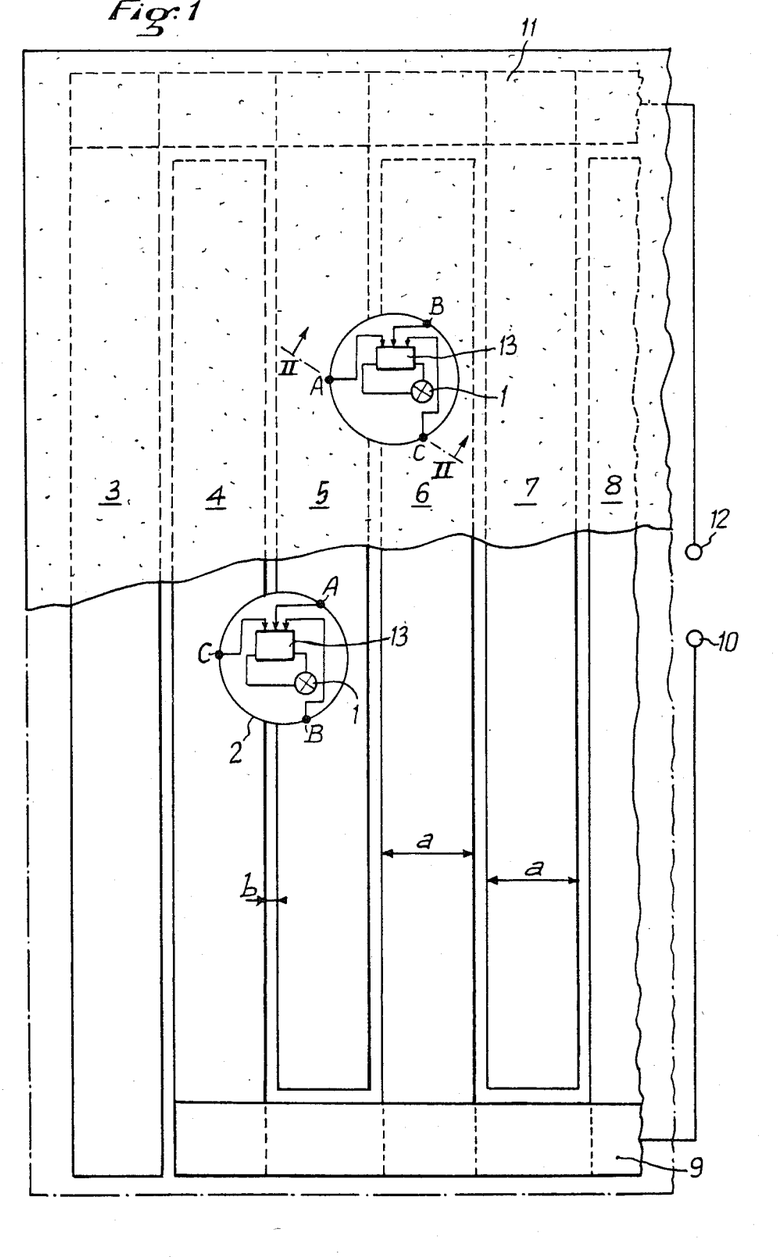
FIG. 1 is a schematic plan view of a device for supplying an electric receiver according to the invention.

Referring now to the drawings, the supply device according to the invention shown in FIG. 1 is adapted to ensure supply of an electric receiver 1 integral with a current pick-up 2 comprising a support of any shape, shown schematically by a circle, which may occupy a variable position on a flat surface. The electric receiver 1 may for example be a lamp of a lighting appliance, such as a standard lamp, placed at any spot on the surface for supporting the support 2 forming current pick-up. Supply of the receivers 1, in the present case of the lamp, is controlled by a switching circuit 13 carried by the support 2 forming current pick-up.

The electrical supply device comprise, on the floor, a network of parallel conducting strips of the same width a and spaced apart from one another. These strips are distributed in two assemblies, namely a first assembly comprising strips 4, 6, 8, etc. of even rows and a second assembly comprising strips 3, 5, 7, etc. of odd rows. These strips may for example be 20 cm wide. At tone of their ends, the strips of even rows 4, 6, 8 of the first assembly are connected to a common transverse conducting strip 9 which is itself connected to a pole of a source of electrical current, D.C. or A.C. (24 V for example). In the same way, strips 3, 5, 7 of odd rows of the second assembly are connected, at one of their ends, to a common transverse conducting strip 11 which is connected to the other pole 12 of the source of electrical current. Strips 4, 6, 8 of even rows and strips 3, 5, 7 of odd rows are spaced apart from one another by a short distance b which may for example be of the order of 1 mm. The strips of even rows 4, 6, 8 stop at a short distance, of the order of 1 mm, from the common transverse strip 11 of the second assembly and the same applies to the strips of odd rows 3, 5, 7 which stop at a short distance from the common transverse strip 9 of the first assembly.

It is possible to use one of the end strips, such as strips 3, to make the return, towards the source of current 12, of a group of strips 3, 5, 7, as well as the transverse strips 9, 11, with the possibility of dividing the whole of the surface into a plurality of independent zones, for a better distribution of the electrical intensities.

Supply of current to receiver 1 is ensured by the current pick-up comprising three sensors A, B, C integral with the support 2 and which are disposed at the apices of an equilateral triangle. This triangle has a height equal to the distance between centers of the strips 3-8. The three current sensors A, B, C are respectively connected to the three inputs of the switching circuit 13 timed or not, provoking supply of receiver 1 if at least two of the three current sensors A, B, C are brought into contact with two of the conducting strips 3-8 at different potentials. This is schematically illustrated in FIG. 1 and it is seen, in the top part thereof, that the sensor A is in contact with strips 5 whilst sensors B and C are in contact with strip 6. In the central part of this figure, the sensor C is in contact with strip 4 whilst the other two sensors A and B are in contact with strip 5. In each of these cases, the switching circuit 13 controls the supply of the receiver 1.

The switching circuit 13 may be made in different ways and elements which are well known in the art may be used for this circuit, such a triacs, thyristors, diodes, transistors, manual switches and even relays.

Figure 2:
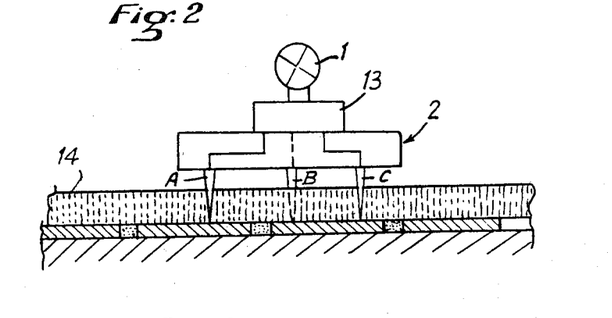
FIG. 2 is a view in section, on a larger scale, along line II—II of FIG. 1.

According to the invention, the conducting strips 3-8 are covered with a layer 14 of insulating material constituted, for example, by a carpet laid on the floor. Sensors A, B, C are furthermore constituted by contact styluses of the same length passing through the insulating covering 14 applied on the conducting strips. It is thus possible to place the support 2 forming current pick-up at any desired spot on the insulating covering 14, electrical supply of the receiver 1 then being automatically established due to the ends of the contact styluses A, B, C coming into contact with two conducting strips 5, 6 of different polarities.

Figure 3:
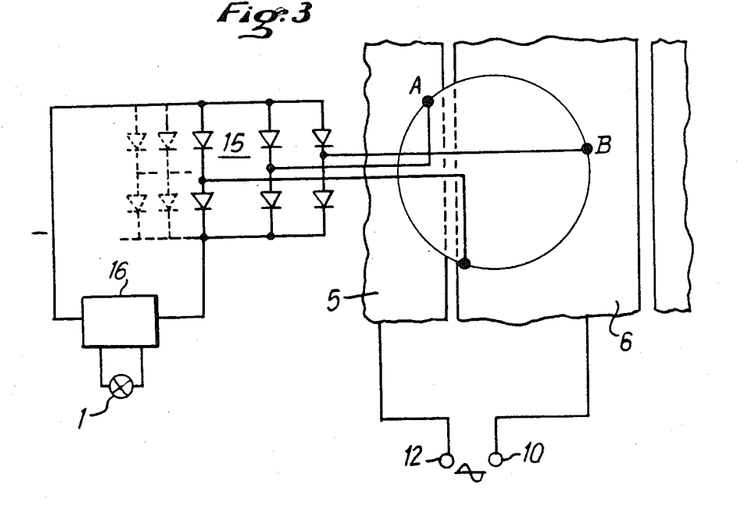
FIG. 3 is a connection diagram of an embodiment of the control circuit in the case of supply with alternating, rectified or direct current.

In the variant embodiment illustrated in FIG. 3, the supply device is provided for supplying alternating, direct of rectified current. The three contact styluses A, B, C are respectively connected to the three A.C. inputs of a tri-phase Graetz bridge generally designated by reference 15 and which may constitute the switching circuit 13 of FIG. 1. This circuit may comprise timing means 16, of any known type, to turn on or provoke the supply of electricity to receiver 1 a certain time after the contact styluses A, B, C have been brought into contact with the conducting strips 3-8.

The device described with reference to FIG. 3 offers the advantage that it ensures a perfect supply whatever the position of the support 2 forming current pick-up with respect to the conducting strips 5, 6, i.e. both along the x-axis and the y-axis and in angular position. As has been stated hereinabove, the equilateral triangle of the contact styluses A, B, C is made so that its height or median is equal to the distance between centers of the strips of aluminium, i.e. substantially equal to the width of these strips. This makes it possible to optimize, to large proportions, the rate of operation of the device with respect to the very slight probabilities of the contact styluses A, B, C engaging in the insulating zone of very small width provided between the conducting strips.

Although the foregoing description has mentioned the supply of the lamp of a lighting appliance such as a standard lamp, it is obvious that the invention is also applicable to the supply of any fixed or movable receiver.

According to a variant, the supply device according to the invention may comprise only two contact styluses or more than three contact styluses disposed in any polygonal configuration such as a square, pentagon, regular or not. In the case of a regular disposition, an additional contact stylus may also be provided at the center of the polygon.

Furthermore, the electric receiver 1 is not necessarily carried by the support 2 of the contact styluses forming current pick-up and it may be located at a certain distance from this support.

Figure 4:
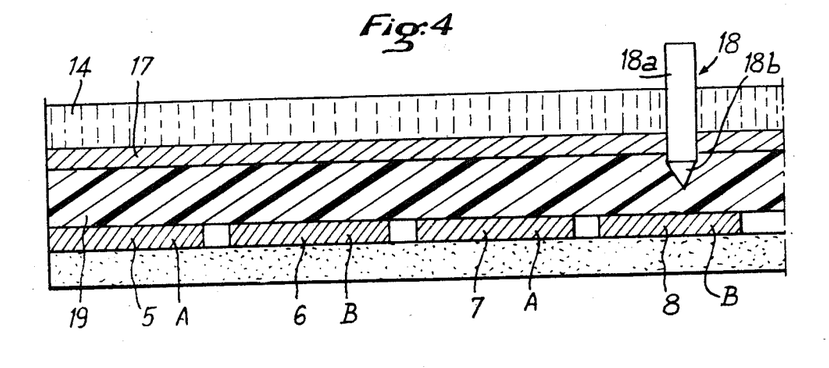
FIG. 4 is a view in vertical section of a variant embodiment in which the device for distributing electrical energy according to the invention is provided with an anti-electrocution safety device.
Figure 5:
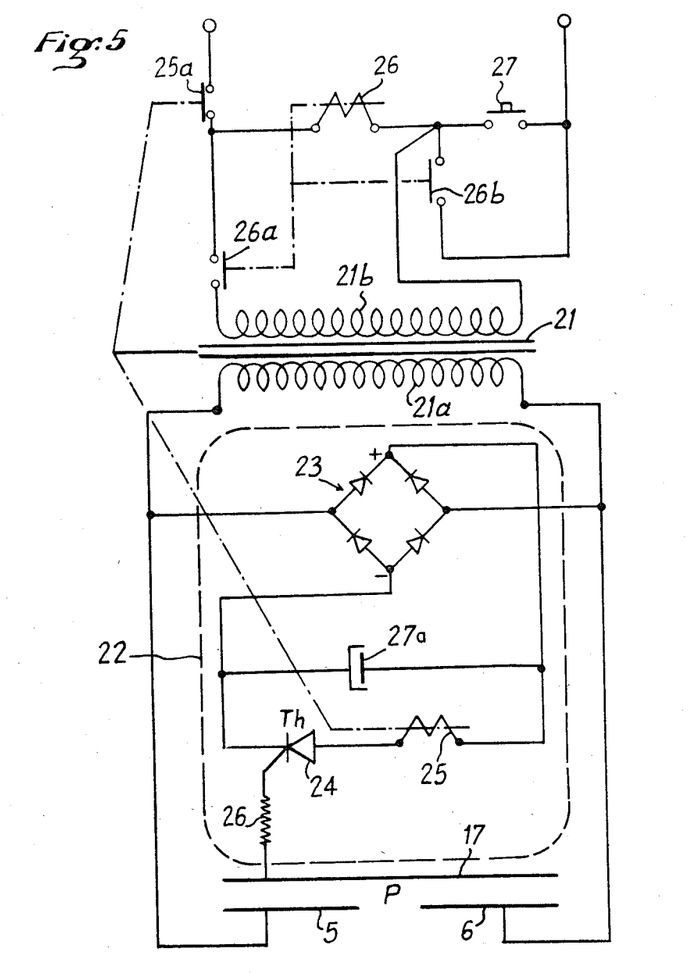
FIG. 5 is a connection diagram of the anti-electrocution safety device.

Referring more particularly to FIGS. 4 and 5, an embodiment of the device for distributing electrical energy at 220 volts, according to the invention, through a carpet, with an anti-electrocution safety device, will now be described. This safety device comprises a protecting plate 17 located beneath the carpet 14 and which is a good conductor of electricity. This protecting plate may be made, in accordance with the standards in force, from conducting foam, metal braiding, solid aluminium or any other similar material. This protecting plate 17 is adapted to be traversed by special contact styluses 18. Each of these contact styluses 18 is insulated over the whole of its length, in its part 18a, with the exception of its lower tip 18b and its upper part, in zone adapted to connect the stylus to the rest of the circuit. Between the protecting plate 17 and the plane in which the conducting strips 5, 6, 7, 8 lie, there is disposed an insulating screen 19, for example made of foam rubber, whose thickness is slightly greater than the length of the conducting tip 18b of the contact stylus 18.

FIG. 5 shows the connection diagram of the anti-electrocution safety device. This device comprises a transformer 21 having a transformation ratio equal to 1. The secondary winding 21a of this transformer is connected, at its ends, respectively to the two assemblies of conducting strips having opposite polarities, which assemblies are represented by conducting strip 5 and 6 alone. This secondary winding 21a is also connected to a detector assembly 22 which comprises a rectifier bridge 23 supplying, between its D.C. output terminals, a thyristor 24 in series with the coil of a relay 25. The gate of this thyristor 24 is connected by a resistor 26, to the protecting plate 17. This resistor 26 which has for example a value of 22 kΩ, is intended to limit the intensity of the gate current in the event of dead short circuit between the protecting plate 17 and the conducting strips 5,6. A capacitor 27a is in addition connected in parallel on the thyristor 24 and the coil 25 of the relay. This relay comprises a normally closed contact 25a which is connected in series in the supply circuit of the pprimary winding 21b of the transformer 21. The safety device also comprises a relay whose coil 26 is connected in shunt on the primary winding 21b and this in series with a switch 27, this switch 27 controlling the electrical supply of the conducting strips 5, 6. The relay 26 comprises two normally open contacts 26a, 26b which are connected in series with the primary winding 21b and which are consequently closed when the switch 27 is pressed.

The safety device which has just been described makes it possible to cut off, virtually instantaneously, the 220 V.A.C. electrical supply of the conducting strips 5, 6 in the event of a passage of current between the protecting plate 17 and an one of the conducting strips 5 and 6. In fact, the passage of such a current provokes triggering of the thyristor 24, working of the relay 25 and opening of the contact 25a, which brings about cut-off of the supply of the transformer 21.

Figure 6:
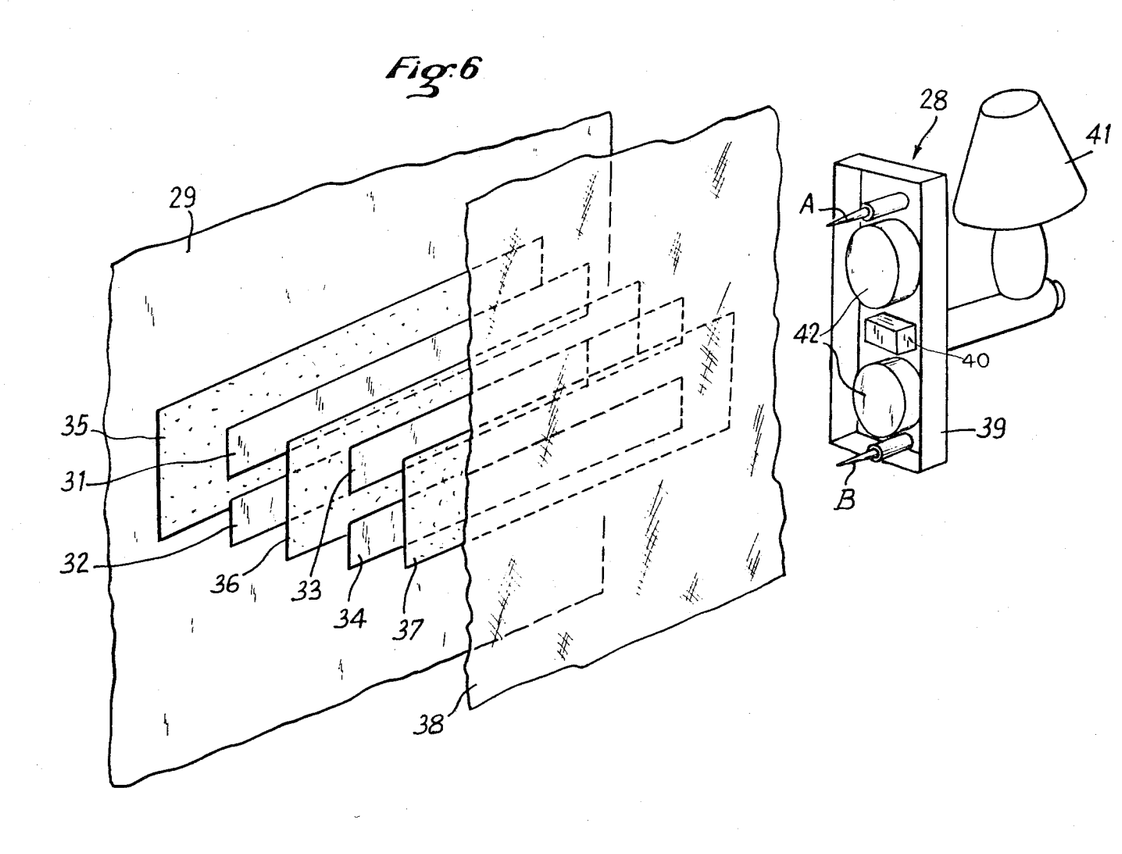
FIG. 6 is an exploded view in perspective of a variant embodiment used for supplying electricity to wall lamps maintained in position by magnetic attraction.
Figure 7:
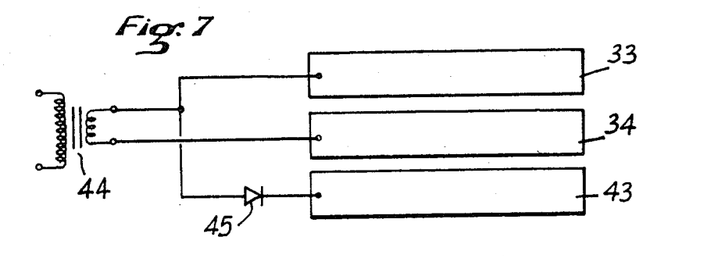
FIG. 7 is a connection diagram of a variant embodiment of the circuit for supplying wall lamps.

Referring more particularly to FIGS. 6 and 7, a variant embodiment used for the electrical supply of wall lamps such as wall lamp 28 shown in FIG. 6, will now be described.

The structure shown in FIG. 6 and which is fixed on a partition 29, comprises a substrate constituted by two horizontal strips 31, 32 of mild steel, insulated from each other. These two strips are entirely covered with respective conducting strips 33, 34 for example of aluminium, intended to conduct the electrical energy. The assembly of these strips 31-34 may be mounted and fixed on the partition 29 on a ceiling, for example by means of double-faced adhesive tapes. In FIG. 6, such an adhesive tape 35 ensures fixation of the two mild steel strips 31, 32 on the partition 29 whilst another double-faced adhesive and insulating tape 36, disposed between the mild steel strips 31, 32 and the strips of aluminium 33, 34, ensures connection between these strips and electrical insulation. A third double-faced adhesive and insulating tape 37 may also be disposed between the two aluminium strips 33, 34 and a furnishing fabric 38 constituting the outer covering of the partition. Furthermore, the wall lamp 28 comprises a base 39 on the front face of which is fixed a lamp 41. On its rear face, the base 39 bears two contact styluses A, B which are adapted to come into contact with the aluminium strips 33, 34 respectively to ensure electrical supply of lamp 41.

The wall lamp 28 is fixed to the wall by magnetic attraction. To this end, the base 39 bears, on the inside, magnets 42 which cooperate with the mild steel strips 31, 32 in order to maintain the whole of the wall lamp 28 applied against the partition 29, due to the magnetic attraction exerted.

From the foregoing description, it will be appreciated that it is a simple matter to position and fix the wall lamp 28; in fact, it suffices to offer the base 39 vertically and to press it against the partition 29, the contact styluses A, B then coming into contact with the aluminium conducting strips 33, 34 to ensure supply of the lamp 41, and the wall lamp 28 remaining in position by magnetic attraction.

FIG. 7 illustrates a variant embodiment in which three conducting strips 33, 34, 43 are used instead of the two aluminium strips 33, 34 provided in the device illustrated in FIG. 6. The two conducting strips 33, 34 are connected respectively to the two ends of the secondary winding of a step-down transformer 44, to ensure supply of these two strips at a voltage of 24 volts, for example from a 220 volt network. Furthermore, one end of the secondary winding of the step-down transformer 44 is connected, via a diode 45, to the third conducting strip 43. Consequently, if the two contact styluses A, B of the wall lamp 28 are brought into contact with the two strips 33, 34, maximum lighting is obtained, while if the two styluses A, B are brought into contact respectively with one of strips 33, 34 and with the third strip 43, reduced lighting is obtained.

The wall lamps used may or may not be electric. If they are electric, they may have a traditional appearance or take any configuration (for example stained glass casings, small casings, musing-diffusing casings, mirrors, paintings, etc.). In public places, it is possible, as a function of the number of casings used, to trigger off an alarm against theft of one of them immediately when the misdeed is committed.

Figure 8:
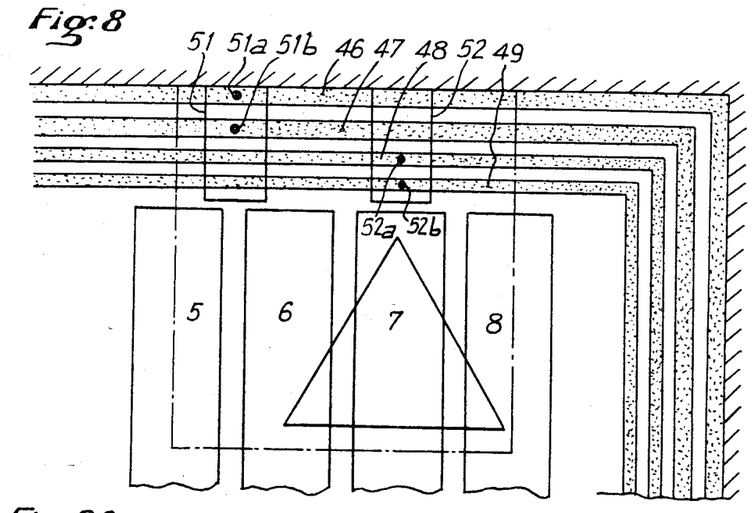
FIG. 8 is a plan view of a device according to the invention ensuring supply of electrical energy to appliances installed in a room and distribution of the "sound" current to these, or to other, appliances.

FIG. 8 shows an application of the device according to the invention to the supply of Hi-Fi equipment installed in a room and to the distribution of "sound" current around the room. The appliances are supplied with alternating current, as in the preceding cases, from the conducting strips 5, 6, 7, 8 placed in the central part f the room, on the floor. In addition, other conducting strips 46, 47, 48, 49 extend all round the room, in the immediate vicinity of the walls, in spaced apart relationship with respect to one another. Strips 46, 47 are provided to ensure distribution of the "sound" current of the left track, while strips 48, 49 ensure distribution of the "sound" current of the right track. With these strips cooperte connectors 51, 52 connected to the appliances having to receive the sound current which are each provided with two contact styluses. The connector 51, associated with the left track, bears two contact styluses 51a, 51b coming respectively into contact with the conducting strips 46, 47. The other connector 52, associated with the right track, also bear two contact styluses 52a, 52b coming respectively into contact with strips 48, 49.

Figure 8A:
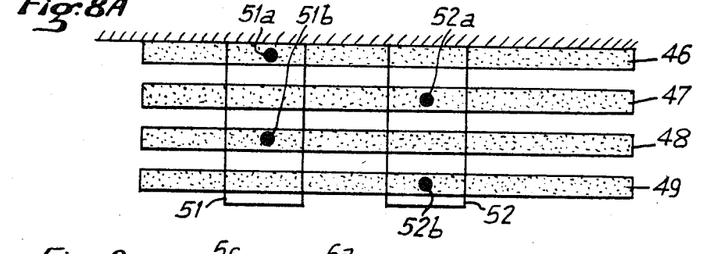
FIG. 8a is a plan view of a variant embodiment of the connectors used in the device of FIG. 8.

In the variant embodiment shown in FIG. 8A, the contact styluses 51a, 51b of the connector 51 are applied respectively on the strips 46, 48, while contact styluses 52a, 52b of the connector 52 are applied respectively on strips 47, 49.

For distribution of the "sound" currents of the two tracks one single connector may also be used, provided with four contact styluses such as styluses 51a, 51b, 52a, 52b, these styluses being spaced apart from one another by distances corresponding to the intervals between the conducting strips 46-49.

The reference for positioning the device as well as the various pick-ups may be the skirting of the wall or a particular coloration of the floor covering.

Beyond a certain level of energy, it may be expedient to provide, in the current pick-ups, switch 40 which opens immediately upon removal of the pick-up from its support surface, in order to avoid electrical break occurring between the contact styluses. To this end, it suffices to provide the body of the pick-up proper in two parts which are mobile with respect to each other, a first part of the body bearing the contact styluses connected to one element of the switch, while the other part of the body bears the other element of the switch.

Figure 9:
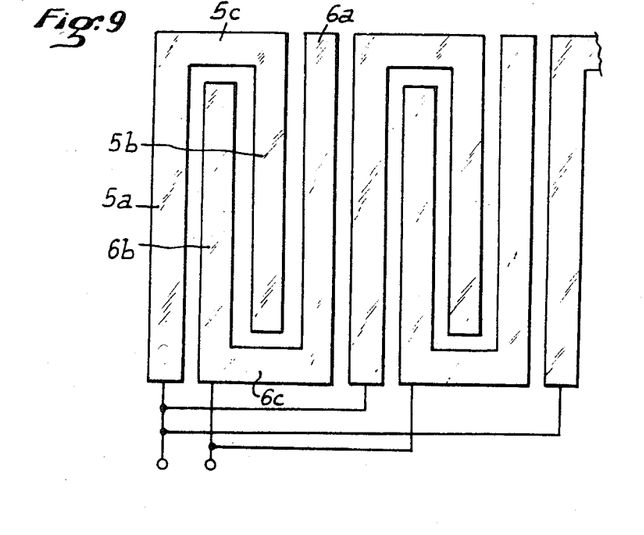
FIG. 9 is a plan view of a variant embodiment of the conducting strips ensuring distribution of the electrical energy.

FIG. 9 illustrates a variant embodiment of the network of the conducting strips in which each of the conducting strips is in the form of a U whose two arms are of unequal lengths. More particularly, one of the conducting strips, of a first polarity, comprises two arms 5a, 5b parallel to each other, of different lengths, arm 5b being shorter than arm 5a, and connected together by a transverse web 5c. The conducting strip of polarity opposite the preceding one also comprises a long longitudinal arm 6a, a short longitudinal arm 6b and a transverse web 6c. The two U-shaped conducting strips are imbricted in each other, the short arm 5b of the first conducting strip extending between the two arms 6b, 6a of the second conducting strip and, similarly, the short arm 6b of the second conducting strip extending between the two arms 5a, 5b of the first conducting strip.

Figure 10:
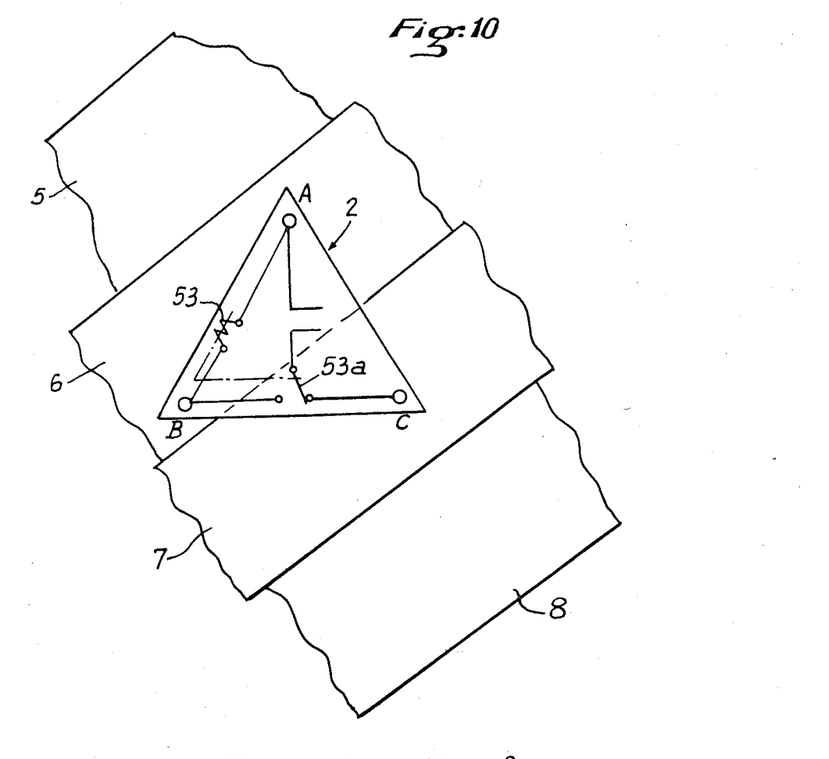
FIG. 10 is a schematic partial plan view of a variant embodiment of the current sensor incorporating contact styluses.

In the variant embodiment illustrated in FIG. 10, the current pick-up 2 comprises a relay coil 53 connected in series between two contact styluses A and B, stylus A being connected to an input terminal of the charge. Furthermore, the relay 53 comprises an inverter contact 53a of which the common is connected to the other input terminal of the load and which is connected, in rest position, to the third contact stylus C and, in working position, to the contact stylus B. Consequently, if the contact styluses A and B are in contact with the same conducting strip 6 of one polarity while only the third contact stylus C is in contact with the conducting strip 7 of opposite polarity, the relay 53 is not energized, the inverter contact 53a is at rest and the load is connected, via the two contact styluses A and C, to the two respective conducting strips 6, 7. On the contrary, if, with contact stylus A always remaining in contact with the conducting strip 6, the other contact stylus B comes into contact with the conducting strip 7 of opposite polarity, relay 53 is actuated, the contact 53 is transferred to working position and, there again, the load is then connected to the two conducting strips 6, 7, but this time by the contact styluses A and B. It is thus possible to supply the load with the same wave form as that which is distributed by the conducting substrate, which is particularly advantageous in alternating current, for supplying a transformer for example.

Figure 11:
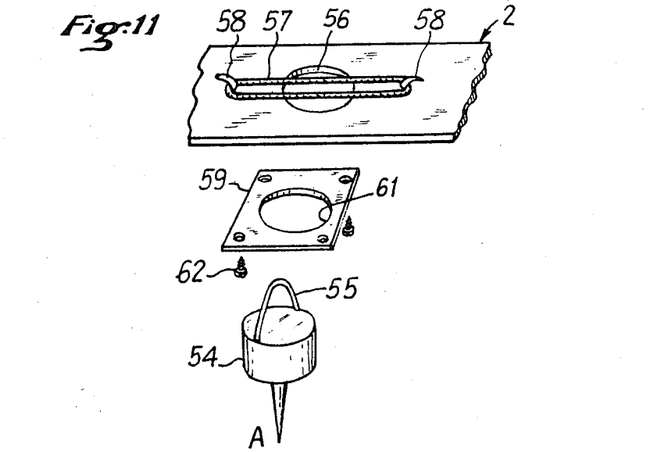
FIG. 11 is an exploded view in perspective of a device for assembling a retractable contact stylus.

FIG. 11 illustrates a device for assembly a retractable contact stylus when this contact stylus is installed beneath heavy objects such as desks, tables, etc... in order not to deteriorate the carpet when moving said furniture.

In this assembly device, the retractable contact stylus A is attached to a bush or bushing 54, in the upper part of which is fixed a staple 55. Furthermore, the current pick-up 2, of which only the lower part is shown, is pierced with an opening 56 through which the staple 55 projects upwardly. A rubber band 57, or any other similar elastic return member, extends across the opening 56, above the lower part of the pick-up 2, to which it is hooked by hooks 58, and it also extends through the staple 55 in order to retain the contact stylus A. Electrical connection with the switching member is made by means of an interposed conducting plate 59 pierced, in its central part, with a hole 61 corresponding to the opening 56 in the pick-up 2. This interposed conducting plate is fixed beneath the lower part of the pick-up 2 by means of screws 62.

The assembly device illustrated in FIG. 11 makes it possible to ensure excellent vertical penetration of the contact stylus A in the insulating covering 14 and in particular it allows the contact stylus to lie flat without breaking, when the pick-up is dragged horizontally near the floor. Consequently, the contact stylus A cannot break and, in such case of dragging, the carpet is not deteriorated. It then suffices to rest the pick-up 2 vertically, after having raised it, to obtain correct operation.

All the embodiments of the invention may be provided with an anti-electrocution safety device, such as the one ilustrated in FIG. 5. In the latter case, the transformer 21 may be eliminated and replaced by a differential circuit breaker or a differentiated switch.

Furthermore, the conducting strips are not necessarily rectilinear, but they may take any desired configuration.

What is claimed is:

1. A device for supplying electric current to an electric receiver comprising:
    (a) a network of electric conducting strips covered with insulating material, including:
        (1) a first assembly of strips adapted to be operatively connected to one pole of a source of electrical current; and
        (2) a second assembly of strips adapted to be operatively connected to another pole of said source of electrical current;
    (b) a movable current pick-up having at least three current sensors capable of coming into electrical contact with said strips; and
    (c) a circuit, having a plurality of inputs operatively connected respectively to said at least three sensors and an output operatively connected to the receiver, for supplying the receiver when at least one of said at least three sensors comes into contact with one conducting strip in said first and second assemblies and at least another of said at least three sensors comes into contact with a second conducting strip in the other of said first and second assemblies, said at least three sensors being of substantially equal length and being adapted to pass through said insulating material.

2. The device according to claim 1, wherein said at least three sensors are disposed at the apices of an equilateral triangle, wherein the length of each side of said equilateral triangle is substantially equal to the distance between the centers of two adjacent conducting strips.

3. The device according to claim 1, wherein each of said conducting strips has the same width and is spaced apart from one another by a given distance.

4. The device according to claim 1, wherein said strips of said first assembly are imbricated alternately with said strips of said second assembly.

5. The device according to claim 1 further comprising:
    (a) a first common transverse conducting strip connected to a pole of said source of electrical current and to one end of each of the strips in said first assembly of strips;
    (b) a second common transverse conducting strip connected to another pole of said source of electrical current and to one end of each of the strips in said second assembly; and
wherein a second end of each of the strips in the first assembly stops a short distance from said second common transverse conducting strip and a second end of each of the strips in the second assembly stop a short distance from said first common transverse conducting strip.

6. The device according to claim 5 wherein an end strip in each of said first and second assemblies is connected to a pole of said source of current.

7. The device according to claim 6 wherein said surface is divided into a plurality of independent zones to ensure better distribution of electricity.

8. The device according to claim 1 wherein said circuit comprises timing means for energizing supply of the receiver within a certain time after said two of said at least three sensors comes into contact with said two conducting strips.

9. The device according to claim 1 further comprising anti-electrocution safety means comprising:
   (a) a conductive protecting plate disposed beneath said at least one layer of insulating material and adapted to be traversed by said at least three sensors, each of said sensors having a lower conducting tip and an upper part, and each of said sensors being insulated over substantially its whole length, except for some lower tip and said upper part, in a zone adapted to connect the sensor to the rest of the circuit;
   (b) an insulating screen interposed between said conductive protecting plate and a plane in which said conducting strips lie, said insulating screen having a thickness slightly greater than the length of said lower conducting tip of each sensor;
   (c) a transformer for connecting said source of electrical current to said two assemblies of conducting strips;
   (d) means for detecting for disconnecting said transformer from said source of electrical current in response to detecting a short-circuit between said protecting plate and said strips.

10. The device according to claim 9, wherein the means for detecting comprises:
   (1) a rectifier bridge connected to a capacitor and having D.C. output terminals; and
   (2) a thyristor connected in series with a relay coil, said thyristor and said relay coil being connected between said D.C. output terminals, said thyristor having a gate which is connected to said conductive protecting plate, and said relay coil comprising a normally closed contact for connecting said source of electrical current to said transformer until a short-circuit occurs.

11. The device according to claim 1, further comprising a structure for electrical supply of wall and ceiling lamps, mounted on a partition, said structure comprising a substrate constituted by parallel steel strips, said steel strips being insulated from one another by conducting strips covering said steel strips, said substrate being covered with an outer wall covering, each wall lamp comprising a base and a rear face, and a plurality of styluses mounted on said rear face adapted to come into contact with said conducting strips for ensuring electrical supply to said lamp carried by said base, said wall lamp being fixed by means of at least one magnet carried by said base and cooperating with said steel strips for maintaining said wall lamp mounted on said partition.

12. The device according to claim 11, wherein said substrate comprises three conducting strips, two of said conducting strips being connected, respectively, to ends of a secondary winding of a step-down transformer, one end of said secondary winding being connected, via a diode, to the third conducting strip.

13. The device according to claim 1, further comprising means for distributing electrical signals, to diverse high fidelity appliances installed in a room, said high fidelity appliances having a right track and a left track, said room having walls, comprising a plurality of conducting strips extending all around said room in the immediate vicinity of the walls, said plurality of conducting strips being spaced apart from one another, at least two of said plurality of conducting strips being provided to ensure distribution of said electrical signals to the left track and two other of said plurality of conducting strips being provided to ensure distribution of said electrical signals to the right track, and connectors being provided with styluses adapted to come into contact with said plurality of conducting strips.

14. The device according to claim 1, wherein said current pick-up comprises a switch adapted to open immediately in response to removal of said pick-up from the surface, for avoiding electrical break occurring between said at least three sensors and said conducting strips.

15. The device according to claim 1, wherein said current pick-up comprises a relay coil connected in series between a first and second sensor of said three sensors and an inverter contact having a common end, said inverter contact adapted to be switched between a first rest position and a second working position, said first sensor being connected to a first input terminal of a load, said common end being connected to a second input terminal of said load, and wherein said inverter contact is connected to a third sensor of said at least three sensors when in said first rest position, and said inverter contact is connected to said second sensor when in said second working position.

16. The device according to claim 1, wherein each of said three sensors is retractably mounted beneath said current pick-up and is adapted to be returned into a vertical position by an elastic member, each sensor being connected to one surface of a bushing, said bushing having a staple attached to another surface thereof, said current pick-up having an opening through which said staple is adapted to project upwardly, said current pick-up including said elastic member extending across said opening and mounted on each side of said opening by means of hooks, said elastic member adapted to extend through said staple for retaining said sensor, said device further comprising an interposed conducting plate for ensuring electrical connection with said circuit, including a hole positioned substantially in the center of said plate and corresponding to said opening.

17. A device for supplying electric current to at least one electric receiver positioned in variable locations on a surface comprising:
   (a) a networkof parallel electric conducting strips disposed on said surface, said strips each having the same width, and being spaced apart from one another by a given distance, said network covered by at least one layer of insulating material, including:
      (1) a first assembly of strips adapted to be connected to one pole of a source of electric current; and
      (2) a second assembly of strips adapted to be connected to another pole of said source of electric current, said strips of said second assembly being imbricated alternately with said first assembly of strips;
   (b) a movable current pick-up having at least three current sensors capable of coming into contact with said strips; and
   (c) a circuit for supplying the receiver when at least one of said at least three sensors comes into contact with one conducting strip in said first and second assemblies and at least another of said at least three sensors comes into contact with a second conducting strip in the other of said first and second assemblies, said circuit having a plurality of inputs connected to said at least three sensors and at least one output connected to said at least one receiver;
wherein said at least three sensors comprise contact styluses of substantially equal length adapted to pass through said at least one layer of insulating material and wherein said at least three styluses are disposed at the apices of an equilateral triangle, wherein the length of each side of said equilateral triangle is substantially equal to said given distance plus an amount substantially equal to the width of said conducting strips.

18. The device according to claim 17, further comprising an anti-electrocution safety means comprising:
   (a) a conductive protecting plate positioned between said strips and said at least one layer of insulating material and adapted to be traversed by said at least three styluses, each of said styluses having a lower conductive tip, an insulated middle part, and an upper part, said upper part comprising a zone adapted to connect said stylus to the rest of the circuit;
   (b) an insulating screen positioned between said conductive protecting plate and a plane in which said conducting strips lie, said insulating screen having a thickness slightly greater than the length of the lower conductive tip of each sensor;
   (c) a transformer for connecting said source of electrical current to said two assemblies of conducting strips;
   (d) means for detecting for disconnecting said transformer from said source of electrical current in response to detecting a short-circuit between said protecting plate and said strips.

19. The device according to claim 18, wherein said means for detecting comprises:
   (1) a rectifier bridge connected to a capacitor and having D.C. output terminals; and
   (2) a thyristor connected in series with a relay coil, said thyristor and said relay coil being connected between said D.C. output terminals, said thyristor having a gate which is connected to said conductive protecting plate, and said relay coil comprising a normally closed contact for connecting said source of electrical current to said transformer until a short-circuit occurs.

* * * * *

UNITED STATES PATENT AND TRADEMARK OFFICE
CERTIFICATE OF CORRECTION

PATENT NO. : 4,578,731

DATED : March 25, 1986

INVENTOR(S) : Johannes ANDRIESSEN et al.

It is certified that error appears in the above-identified patent and that said Letters Patent is hereby corrected as shown below:

In the Assignee, Section 73, change "Verry-sous-Salmaise" to ---Verrey-sous-Salmaise---.

In column 1, line 17, change "necessry" to ---necessary---.

In column 2, line 59, change "tone" to ---one---.

In column 3, line 9, change "strips" (second occurrence) to ---strip---.

In column 3, line 27, change "strips" to ---strip---.

In column 4, line 63, change "pprimary" to ---primary---.

In column 5, line 8, change "an" to ---any---.

In column 6, line 17, change "f" to ---of---.

In column 6, line 24, change "cooperte" to ---cooperate---.

In column 6, line 67, change "imbricted" to ---imbricated---.

In column 7, line 33, change "assembly" to ---assembling---.

In column 7, line 66, change "ilustrated" to ---illustrated---.

In column 9, line 2, change "electrocuction" to ---electrocution---.

UNITED STATES PATENT AND TRADEMARK OFFICE
CERTIFICATE OF CORRECTION

PATENT NO. : 4,578,731

DATED : March 25, 1986

INVENTOR(S) : Johannes Andriessen et al

It is certified that error appears in the above-identified patent and that said Letters Patent is hereby corrected as shown below:

In the section listing the foreign patent documents, add the following document: -- 39761 1-1971 Australia --.

Signed and Sealed this

Second Day of September 1986

[SEAL]

Attest:

Attesting Officer

DONALD J. QUIGG

Commissioner of Patents and Trademarks